United States Patent
Peng

[11] Patent Number: 6,075,350
[45] Date of Patent: Jun. 13, 2000

[54] POWER LINE CONDITIONER USING CASCADE MULTILEVEL INVERTERS FOR VOLTAGE REGULATION, REACTIVE POWER CORRECTION, AND HARMONIC FILTERING

[75] Inventor: Fang Zheng Peng, Knoxville, Tenn.

[73] Assignee: Lockheed Martin Energy Research Corporation, Oak Ridge, Tenn.

[21] Appl. No.: 09/296,980

[22] Filed: Apr. 22, 1999

Related U.S. Application Data

[60] Provisional application No. 60/083,001, Apr. 24, 1998.

[51] Int. Cl.$^7$ ........................................................ G05F 1/70
[52] U.S. Cl. ............................................. 323/207; 363/40
[58] Field of Search .................................. 323/205, 207;
363/39, 40, 43, 95, 97, 71; 307/105

[56] References Cited

U.S. PATENT DOCUMENTS

| | | |
|---|---|---|
| 3,581,212 | 5/1971 | McMurray . |
| 3,867,643 | 2/1975 | Baker et al. . |
| 4,052,657 | 10/1977 | Kleiner et al. . |
| 4,052,658 | 10/1977 | Hucker . |
| 4,096,557 | 6/1978 | Schwarz ........................................ 363/9 |
| 4,470,005 | 9/1984 | Gyugyi . |
| 4,571,535 | 2/1986 | Gyugyi . |
| 5,006,973 | 4/1991 | Turner ......................................... 363/34 |
| 5,270,657 | 12/1993 | Wirth et al. . |
| 5,311,419 | 5/1994 | Shires . |
| 5,329,221 | 7/1994 | Schauder . |
| 5,345,375 | 9/1994 | Mohan . |
| 5,424,627 | 6/1995 | Clark et al. . |
| 5,465,203 | 11/1995 | Bhattacharya et al. .................... 363/40 |
| 5,481,448 | 1/1996 | Nakata et al. . |
| 5,526,252 | 6/1996 | Erdman ....................................... 363/41 |
| 5,532,575 | 7/1996 | Ainsworth et al. . |
| 5,535,114 | 7/1996 | Horie et al. . |
| 5,642,275 | 6/1997 | Peng et al. . |
| 5,644,483 | 7/1997 | Peng et al. . |
| 5,648,894 | 7/1997 | DeDoncker et al. ...................... 363/39 |
| 5,751,138 | 5/1998 | Venkata et al. .......................... 323/207 |
| 5,757,099 | 5/1998 | Cheng et al. ............................. 307/105 |
| 5,883,796 | 3/1999 | Cheng et al. .............................. 363/40 |

FOREIGN PATENT DOCUMENTS

| | | |
|---|---|---|
| 76 12062 | 11/1977 | France . |
| 2294821 | 8/1996 | United Kingdom . |

OTHER PUBLICATIONS

"A Static VAR Generator Using a Staircase Waveform Multilevel Voltage–Source Converter," by Fang Zheng Peng & Jih–Sheng Lai in *Power Quality*, Sep. 1994 Proceedings, pp. 58–66.

"An Active Power Quality Conditioner for Reactive Power and Harmonics Compensation," by N.R. Raju, S.S. Venkata, R.A. Kagalwala, & V.V. Sastry, in an unidentified publication, on Dec. 6, 1995, pp. 209–214.

(List continued on next page.)

*Primary Examiner*—Adolf Deneke Berhane
*Attorney, Agent, or Firm*—Jones & Askew, LLP

[57] ABSTRACT

A power line conditioner using cascade multilevel inverter used for voltage regulation, reactive power (var) compensation and harmonic filtering, including the control schemes for operating the cascade inverter for voltage regulation and harmonic filtering in distribution systems. The cascade M-level inverter consists of (M–1)/2 H-bridges in which each bridge has its own separate DC source. This new inverter (1) can generate almost sinusoidal waveform voltage with only one time switching per line cycle, (2) can eliminate transformers of multipulse inverters used in the conventional static VAR compensators, and (3) makes possible direct connection to the 13.8 kV power distribution system in parallel and series without any transformer. In other words, the power line conditioner is much more efficient and more suitable to VAR compensation and harmonic filtering of distribution systems than traditional multipulse and pulse width modulation (PWM) inverters. It has been shown that the new inverter is specially suited for simultaneous VAR compensation and harmonic filtering.

34 Claims, 7 Drawing Sheets

OTHER PUBLICATIONS

"Development of a ±100 MVAR Static Condenser for Voltage Control of Transmission Systems," by C. Schauder, M. Gernhardt, E. Stacey, T. Lemak, L. Gyugyi, T.W. Cease & A. Erdis, a paper presented at the IEEE/PES 1994 Summer Meeting, San Francisco, California, Jul. 24–28, 1994.

"Which is Better at a High Power Reactive Power Compensation System: High PWM Frequency or Multiple Connections?" by Nagataka Seki & Hiroshi Uchino, IEEE Doc No. 0–7803–1993–Jan. 1994, pp. 946–953.

"Analysis of GTO–Based Static VAR Compensators," by D.R. Trainer, S.B. Tennakoon, & R.E. Morrison in *IEEE Proceedings—Electric Power Applications*, vol. 141, No. 6, Nov. 1994, pp. 293–302.

"Simulation and Experimental Study of a Reactively Loaded PWM Converter as a Fast Source of Reactive Power," by Jacobus D. Van Wyk, Dirk Adrian Marshall & Septimus Boshoff in *IEEE Transactions on Industry Applications*, vol. 1A–22, No. 6, Nov./Dec. 1986, pp. 1082–1090.

"Force–Commutated Reactive–Power Compensator," by Loren H. Walker, in *IEEE Transactions on Industry Applications*, vol. 1A–22, No. 6, Nov./Dec. 1986, pp. 1091–1104.

"Controlling a Back–to–Back DC Link to Operate as a Phase Shift Transformer," by D.A. Woodford & R.W. Menzies, paper 14–202 in CIGRE 1994.

"A Comparison of Different Circuit Configurations for an Advanced Static VAR Compensator (ASVC)," by D. Wuest, H. Stemmler & G. Scheuer in *IEEE Power Electronics Specialists Conference*, Toledo, Spain, Jun. 29–Jul. 3, 1992 (PESC '92 Record) vol. 1, pp. 521–529.

Japanese article "Static Type Reactive Power Generator (SVG) of Shinbiwajima Transformer Station," by Shigeru Nakajima and Ichibei Komori in *Tetsudo to Denki Gijutsu*("*Railroad and Electric Technology*") vol. 5 No. 6 (1994) pp. 41–45 (w/translation).

A product brochure by Haefely Trench entitled, "Adaptive VAR Compensator" (undated) 8 pages.

"Control Strategy of Active Power Filters Using Mulitple Voltage–Source PWM Converters," by Hirofumi Akagi, Akira Nabae, & Satoshi Atoh, in *IEEE Transactions on Industry Applications*, vol. 1A–22, No. 3, May/Jun. 1986, pp. 460–465.

"Naturally Commutated Thyristor–Controlled High–Pulse VAr Compensator," by J. Arrillaga, R.D. Brough, & R.M. Duke, in *IEEE Proceedings—Generation, Transmission & Distribution*, vol. 142, No. 2, Mar. 1995, pp. 219–224.

"A Novel Multilevel Structure for Voltage Source Inverter," by M. Carpita, S. Tenconi, & M. Fracchia in *EPE Firenze*, 1991, pp. 1–090 through 1–094.

"Modeling, Analysis and Control of Static VAr Compensator Using Three–Level Inverter," by Guk C. Cho, Nam S. Choi, Chun T. Rim & Gyu H. Cho, in *Conference Record of the IEEE Industry Applications Society Annual Meeting*, Houston, Texas, Oct. 4–9, 1992, vol. 1, pp. 837–843.

"Modeling and Analysis of a Multilevel Voltage Source Inverter Applied as a Static Var Compensator," by Nam S. Choi, Guk C. Cho, & Gyu H. Cho, in *International Journal of Electronics*, 1993, vol. 75, No. 5, 1015–1034.

"Modeling and Analysis of a Static VAr Compensator Using Multilevel Voltage Source Inverter," by Nam S. Choi, Guk C. Cho & Gyu H. Cho, in *Conference Record of the 1993IEEE Industry Applications Conference*, 28th IAS Annaul Meeting, Toronto, Canada, Oct. 1993, pp. 901–908.

"Experimental Investigation of an Advanced Static VAr Compensator," by J.B. Ekanayake, N Jenkins, & C.B. Cooper in *IEE Proceedings—Generation, Transmission and Distribution*, vol. 142, No. 2, Mar. 1995, pp. 202–210.

"Active AC Power Filters," by L. Gyugyi & E.C. Strycula, in *IAS '76 Annual*, 19–C,pp. 529–535.

"Principles and Applications of Static Thyristor–Controlled Shunt Compensators," by L. Gyugyi, R.A. Otto, & T.H. Putman, in *IEEE Transactions on Power Apparatus and Systems*, vol. PAS–97, No. 5, Sep./Oct. 1978, pp. 1935–1945.

"Comparison of Multilevel Inverters for Static VAr Compensation," by Clark Hochgraf, Robert Lasseter, Deepak Divan, & T.A. Lipo, in IEEE Doc. No. 0–7803–1993–Jan. 1994, pp. 921–928.

"A New N–Level High Voltage Inversion System," by Young–Seok Kim, Beom–Seok Seo & Dong–Seok Hyun, in IEEE Doc No. 0–7803–0891–Mar. 1993, pp. 1252–1258.

"High–Performance Current Control Techniques for Applications to Multilevel High–Power Voltage Source Inverters," by Mario Marchesoni, in *IEEE Transactions on Power Electronics*, vol. 7, No. 1, Jan. 1992, pp. 189–204.

"Advanced Static Compensation Using a Multilevel GTO Thyristor Inverter," by R.W. Menzies & Yiping Zhuang, in *IEEE Transactions on Power Delivery*, vol. 10, No. 2, Apr. 1995, pp. 732–738.

"Analysis and Design of a Three–Phase Current Source Solid–State VAr Compensator," by Luis T. Moran, Phoivos D. Ziogas, & Geza Joos in *IEEE Transactions on Industry Applications*, vol. 25, No. 2, Mar./Apr. 1989, pp. 356–365.

"Development of a Large Static VAr Generator Using Self–Communtated Inverters for Improving Power System Stability," by Shosuke Mori, Masatoshi Takeda et al. in *IEEE Transactions on Power Systems*, vol. 8, No. 1, Feb. 1993, pp. 371–377.

"A Study of Active Power Filters Using Quad–Series Voltage–Source PWM Converters for Harmonic Compensation," by Fang Zhang Peng, Hirofumi Akagi & Akira Nabae in *IEEE Transactions on Power Electronics*, vol. 5, No. 1, Jan. 1990, pp. 9–15.

| Modulation Index | Phase Angles [RAD.] | | | | |
|---|---|---|---|---|---|
| MI | $\theta_1$ | $\theta_2$ | $\theta_3$ | $\theta_4$ | $\theta_5$ |
| 0.500 | 0.6236 | 0.8179 | 1.0070 | 1.2117 | 1.4518 |
| 0.510 | 0.6218 | 0.8048 | 0.9931 | 1.2010 | 1.4340 |
| ... | ... | ... | ... | ... | ... |
| 0.910 | 0.0695 | 0.1600 | 0.3135 | 0.4980 | 0.7076 |
| ... | ... | ... | ... | ... | ... |
| 1.000 | 0.0000 | 0.0000 | 0.0000 | 0.0000 | 0.0000 |

6,075,350

POWER LINE CONDITIONER USING CASCADE MULTILEVEL INVERTERS FOR VOLTAGE REGULATION, REACTIVE POWER CORRECTION, AND HARMONIC FILTERING

REFERENCE TO RELATED APPLICATION

This application claims priority to U.S. Provisional Patent Application Serial No. 60/083,001 filed Apr. 24, 1998.

TECHNICAL FIELD

This invention relates to electric power line conditioning devices and, more particularly, relates to a power line conditioner using cascade multilevel inverters for voltage regulation, reactive power correction, and harmonic filtering.

BACKGROUND OF THE INVENTION

Recently, power quality and custom power have been hot topics because of the widespread use of non-linear electronic equipment and the stricter power quality requirements of sensitive loads. To provide high power quality at the point of common coupling (PCC) of a distribution system, line conditioning, including voltage regulation, reactive power (VAR) compensation, and harmonic filtering can provide important advantages.

Traditionally, a multipulse inverter consisting of several voltage-source inverters connected together through a zigzag-arrangement of transformers is used for VAR compensation. These transformers (1) are the most expensive equipment in the system, (2) produce about 50% of the total losses of the system, (3) occupy a large area of real estate, about 40% of the total system, (4) cause difficulties in control due to direct-current (DC) magnetizing and surge overvoltage problems resulting from saturation of the transformers, and (5) are unreliable.

Correspondingly, PWM inverters with ~10 kHz of high switching frequency have been used for harmonic compensation and static VAR compensation. However, the high initial and running costs have been hindering its practical use in power distribution systems. In addition, it is difficult for PWM inverter based active filters to comply with electromagnetic interference (EMI) requirements (e.g., IEC and FCC Class A & B EMI regulations).

Therefore, there is a continuing need for an improved power line conditioner that is operable for voltage regulation, reactive power correction, and harmonic filtering. In particular, there is a need for a power line conditioner that does not rely on transformers or PWM active filters.

SUMMARY OF THE INVENTION

The present invention meets the needs described above in a power line conditioner including a cascade multilevel inverter that is controlled to provide harmonic filtering, voltage regulation and/or reactive power compensation. The power line conditioner performs these functions independently or in combination. The cascade multilevel inverter eliminates the bulky transformers required by static VAR compensators (SVCs) that employ the multipulse inverter and can respond much faster. The power line conditioner using this type of inverter generates almost sinusoidal staircase voltage with only one time switching per line cycle.

The present invention achieves superior suitability for VAR compensation. In addition, when the cascade inverter is applied to line conditioning and active filtering of a distribution system, it is expected that the initial and running costs and the EMI will be dramatically reduced below that of the traditional PWM inverter. The new power line conditioner also overcomes challenging problems for harmonic filtering, such as voltage control and balance of each DC capacitor. Specifically, the invention includes a voltage control scheme that solves the problems associated with harmonic filtering. A power line conditioning system (10 kVA) using an 11-level cascade inverter (21-level line-to-line voltage waveform) operating at 60 Hz fundamental electric power frequency is described to illustrate an embodiment of the invention. Analytical, simulated, and experimental results show the feasibility and superiority of the new power line conditioner.

Generally described, the invention includes a power line conditioner that detects a harmonic component in current flowing in an electric power line and computes a desired control voltage for extracting the harmonic component from the current flowing in the electric power line. Specifically, the power line conditioner computes a set of triggering phase angles for producing a quasi-square wave approximation of the control voltage. The power line conditioner also receives a direct-current power source feedback signal that represents a continually obtained fully-charged voltage level in a plurality of direct-current power sources of a cascade multi-level inverter. Based on the direct-current power source feedback signal, the power line conditioner computes a direct-current phase angle offset for continually obtaining a desired fully-charged voltage level in the direct-current power sources. The power line conditioner also drives the cascade multi-level inverter to produce an output voltage corresponding to the quasi-square wave approximation of the control voltage adjusted by the direct-current phase angle offset, and supplies the output voltage to the electric power line to substantially extract the harmonic component from the current flowing in the electric power line.

The cascade multi-level inverter of the power line conditioner includes a separate direct-current power source for each of a plurality of cascade levels. In a typical three-phase embodiment, the cascade multi-level inverter includes a separate cascade leg of series-connected full-bridge inverters for each of phases of the electric power line. Each leg of the cascade multi-level inverter may be connected in parallel or in series with a corresponding phase of the electric power line. The power line conditioner may also include a filter for smoothing the output voltage before supplying the output voltage to the electric power line.

The power line conditioner typically detects the harmonic component in the current flowing in the electric power line by obtaining a load current signal for the electric power line, and filtering the load current signal to remove the fundamental frequency. In addition, the power line conditioner typically produces a quasi-square wave approximation of the control voltage that is composed of a number of quasi-square component waves that each define a duty cycle for a level of the quasi-square wave approximation of the control voltage. To balance the voltage in the direct-current power sources, the power line conditioner rotates the duty cycles among the cascade levels of the cascade multi-level inverter.

The power line conditioner may use two different control methods for driving the multi-level cascade inverter to produce the desired output voltage. For the first control method, the control system computes a phase control voltage magnitude and angle for each phase. The control system then computes a phase control voltage waveform corresponding to the phase control voltage magnitude and angle for each phase, and drives the cascade multi-level inverter to produce a phase output voltage that approximately follows the phase control voltage magnitude and angle for each phase while continually obtaining the desired fully-charged voltage level in the direct-current power sources of the cascade multi-level inverter.

For the second control method, the control system computes a multi-phase control voltage magnitude representative of an instantaneous combination of a phase voltage and angle for each phase. The control system then determines a modulation index corresponding to the multi-phase control voltage magnitude and looks up a predefined set of triggering phase angles for each phase corresponding to the modulation index. The control system then drives the cascade multi-level inverter to produce a phase output voltage corresponding to the triggering phase angles for each phase while continually obtaining the desired fully-charged voltage level in the direct-current power sources of the cascade multi-level inverter.

The power line conditioner typically computes the control voltage (i.e., the voltage desired at the terminal between the electric power line and the power line conditioner to substantially cancel out the harmonic and/or reactive component of the load current) by first receiving a current feedback signal representing the current flowing into the power line conditioner and receiving a voltage feedback signal representing the terminal voltage at the point where the power line conditioner supplies the output voltage to the electric power line. The power line conditioner then computes an error signal by comparing the current feedback signal to the harmonic component of the current flowing in the electric power line. The power line conditioner then computes the control voltage by combining the voltage feedback signal with the error signal adjusted by a gain, and controlling the gain to minimize the error signal.

To simultaneously provide VAR compensation and harmonic filtering, the power line conditioner may detect a reactive component in addition to the harmonic component in the current flowing in the electric power line. For example, the power line conditioner may detecting the reactive component in the current flowing in the electric power line by obtaining a line voltage signal for the electric power line and computing a phase angle between the line voltage and the load current signals. The power line conditioner then computes a dual-purpose control voltage for simultaneously extracting the harmonic and reactive components from the current flowing in the electric power line. The power line conditioner then computes a set of triggering phase angles for producing a quasi-square wave approximation of the dual-purpose control voltage. The power line conditioner then drives the cascade multi-level inverter to produce a dual-purpose output voltage corresponding to the quasi-square wave approximation of the dual-purpose control voltage adjusted by the direct-current phase angle offset, and supplies the dual-purpose output voltage to the electric power line to substantially extract the harmonic component and the reactive component from the current flowing in the electric power line.

That the invention improves over the drawbacks of previous power line conditioners and accomplishes the advantages described above will become apparent from the following detailed description of the exemplary embodiments and the appended drawings and claims.

DETAILED DESCRIPTION OF EMBODIMENTS OF THE INVENTION

Figure 1:
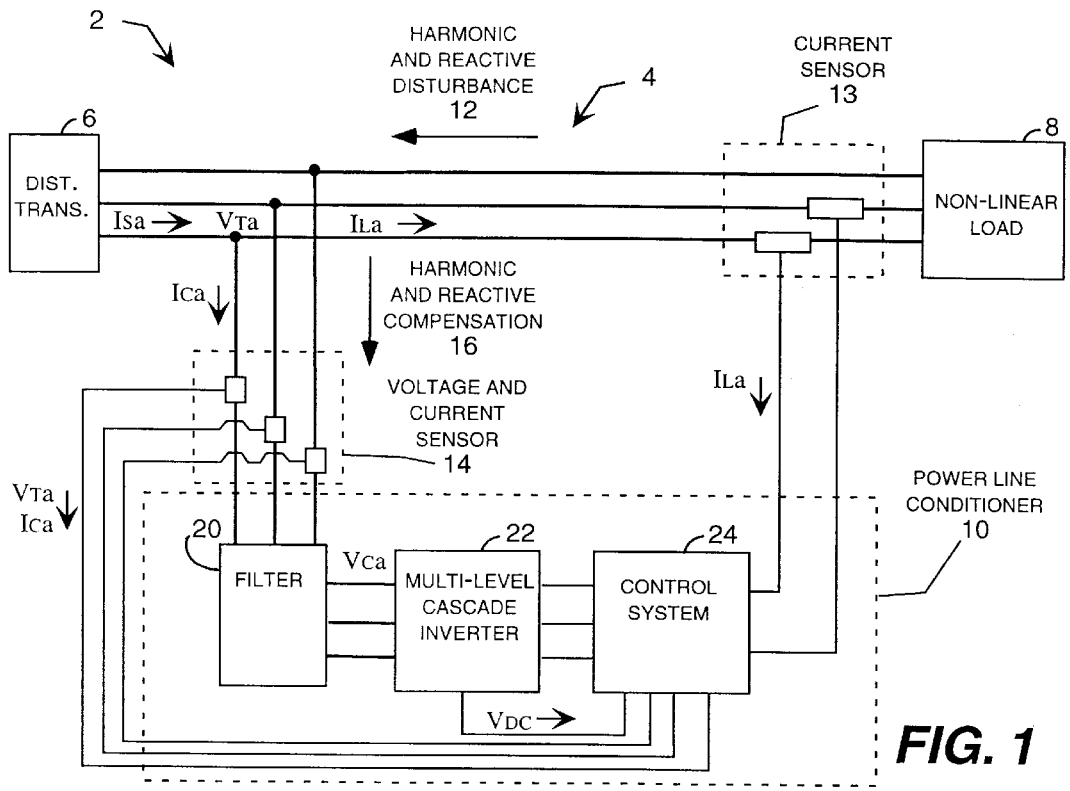
FIG. 1 is a one-line diagram of parallel-connected power line conditioner for a distribution system.

The present invention is typically embodied in a power line conditioner for electric power distribution circuits. That it, the power line conditioner is typically connected to a distribution feeder that provides electric power to a number of different customers. In this position in the electric system, the power line conditioner prevents harmonic and/or reactive disturbances created by one customer from adversely affecting the quality of electric power supplied to other customers connected upstream from the power line conditioner (i.e., closer to the transformer) on the same distribution feeder. The power line conditioner connected to a distribution feeder can be used to correct for harmonic and reactive disturbances, both individually and in combination, caused by non-liner loads. These non-linear loads typically include industrial applications using large DC motors, such as assembly lines, coal mines, electric trains, and so forth. Other large non-linear loads include large office buildings with significant computer loads, arc welders and furnaces, farms and grain elevators, and many others.

Nevertheless, those skilled in the art will appreciate that by varying the current and voltage ratings of the various components and/or the number of levels in the multi-level inverter, embodiments of the invention may be constructed for connection at sub-transmission or transmission voltages. Similarly, embodiments of the invention may be constructed for use at customer-premises voltages, both single- and three-phase. For example, power line conditioners may be constructed for conditioning the power supplied to individual non-linear loads within a customer's premises to prevent those loads, such as DC motors, arc welders, and the like from adversely affecting sensitive loads within the customer's premises, such as computers, dairy milking machines, communication equipment, and so forth.

The power line conditioner described in this specification operates at the standard North American electric power fundamental frequency of 60 Hz. Those skilled in the art will appreciate that this device can be easily adapted to operate at the standard 50 Hz electric power fundamental frequency used in other parts of the world. In addition, the power line conditioner could be configured to operate at other fundamental frequencies, such as 400 Hz used in some airline applications, and any other fundamental frequency that a particular application may call for.

The experimental power line conditioner described in this specification also operates in a parallel-connected, delta configuration for a three phase electric power line. Those skilled in the art will appreciate that this device can be easily adapted to operate in a series-connected configuration, a wye configuration, or for a single phase electric power line. In the event that a different number of phases or a different connection configuration is desired for other applications, the power line conditioner may also be adapted for these applications.

Turning now to the figures, in which like numerals refer to like elements through the several figures, FIG. 1 is a one-line diagram of a portion of an electric power system 2 including a distribution feeder 4 providing electric power from a distribution transformer 6 to a non-linear load 8. The system includes a power line conditioner 10 connected in parallel configuration with the distribution feeder 4 and operated to cancel out a harmonic and/or reactive disturbance 12 created by the non-linear load 8. In other words, the power line conditioner 10 is operated to cause a current (Ica) substantially equal to the harmonic and/or reactive component of the load current 12 to flow into the power line conditioner. As a result, the current flowing into the power line conditioner 10 cancels out the harmonic and/or reactive disturbance 12, producing a clean sinusoidal line voltage (Vta) that closely approximates the desired voltage.

The power line conditioner 10 includes a filter 20, which typically includes a series inductor and a shunt capacitor. The filter 20 smoothes the quasi-square wave or stair-step output voltage produced by a multi-level cascade inverter 22. The series inductor of the filter 20 also provides a reactance between the electric power line 4 and the multi-level cascade inverter 22, which both act like voltage sources. The series inductor of the filter 20 prevents uncontrolled circulating currents from flowing between the electric power line 4 and the multi-level cascade inverter 22, and allows the power line conditioner 10 to extract a precisely controlled current (Ica) containing the desired harmonic and/or reactive components.

The power line conditioner 10 also includes a control system 24 that drives the multi-level cascade inverter 22. Specifically, the control system 24 drives the cascade multi-level inverter 22 to substantially extract the harmonic and/or reactive component 12 from the current flowing in the electric power line 4 while continually obtaining a desired fully-charged voltage level in the direct-current power sources of the cascade multi-level inverter.

To perform this control function, the control system 24 receives four control signals for each phase (only phase "a" parameters are identified for convenience): (1) a load current signal (Ila) representing the current supplied to the non-linear load 8, (2) a DC power source feedback signal (Vdc) representing the DC voltage continually obtained by a representative DC power source of the multi-level cascade inverter 22, (3) a current feedback signal (Ica) representing the current flowing into the power line conditioner 10, and (4) a voltage feedback signal (Vta) representing the voltage at the terminal connecting the output of the power line conditioner 10 to the electric power line 4. Those skilled in the art will appreciate that only two phases of current signals are required in a three-phase configuration because the three phase currents sum to zero. In a three-phase four-wire configuration, on the other hand, all three phase currents or two phases currents and the neural current should be measured. In either configuration, all at least one phase voltage (Vta, Vtb, Vtc) or one phase-to-phase voltage (Vtab, Vtbc, Vtca) should be measured. In addition, due to duty cycle rotation among the levels of the multi-level cascade inverter 22, the voltage of only one capacitor (Vdc) may be measured for each phase of the inverter.

The control system 24 uses these control signals in a control loop to match the current (Ica) flowing into the power line conditioner 10 to the harmonic and/or reactive current disturbance 12 detected in the current (Ila) supplied to the load 8. This is accomplished by causing the multi-level cascade inverter 22 to drive the line voltage at the terminal (Vta) to a desired clean sinusoidal waveform. Adjusting the line voltage in this manner causes the current flowing into the power line conditioner 10 to match, and thus cancel out, the harmonic and/or reactive current disturbance 12 created by the load 8.

To implement the control loop, the power line conditioner 10 detects the harmonic and/or reactive current disturbance 12 and compares it to the actual current (Ica) flowing into the power line conditioner 10 to obtain an error signal. This error signal, as adjusted by a gain, is then used as a feedback control parameter to adjust the output voltage ($V_c$a) of the power line conditioner 10. The gain is then adjusted to minimize the error.

To perform this control function in real-time, the control system 24 operates at a sufficient high sampling or control loop rate, such as 10 kHz, to allow it to perform the control function for an electric power system operating at 60 Hz fundamental frequency. Those skilled in the will appreciate that the sampling rate of the power line conditioner 10 may be altered somewhat, so long as the sampling rate is fast enough to allow the power line conditioner 10 to maintain an output voltage that matches the desired control voltage within the desired accuracy. Stated differently, the sampling rate should be fast enough to keep the error stable and within a desired range.

Figure 2:
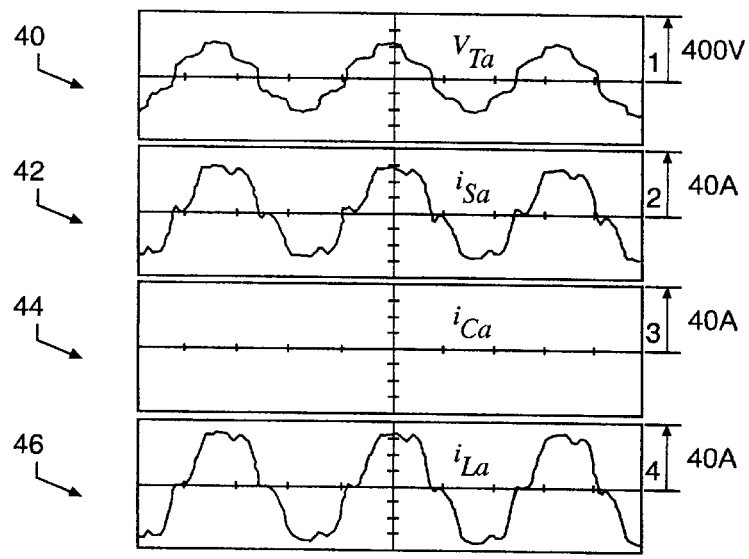
FIG. 2 illustrates certain voltages and currents in the circuit of FIG. 1 when the owe line conditioner is inactive.
Figure 3:
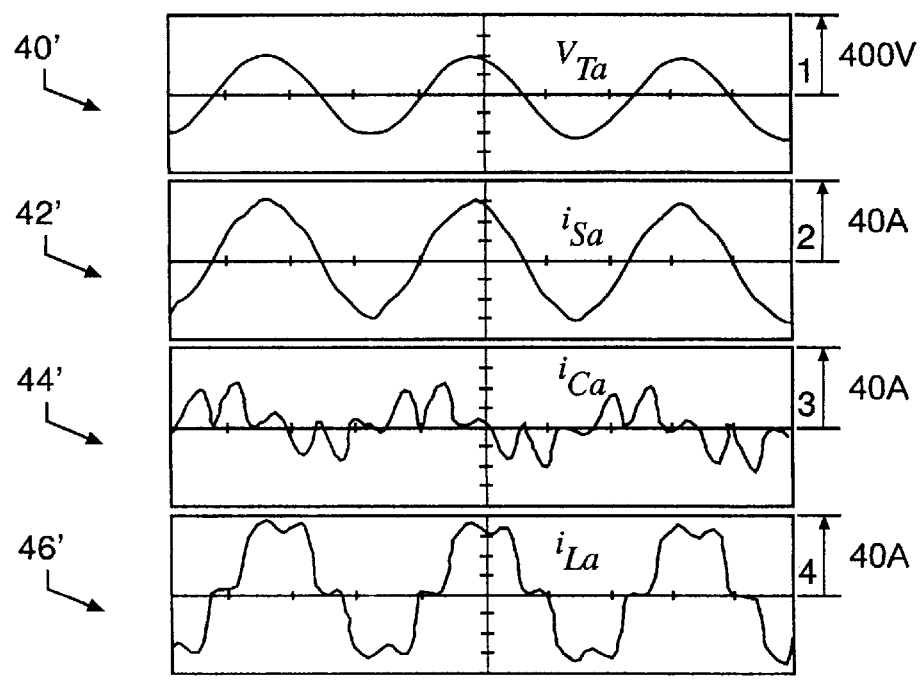
FIG. 3 illustrates certain voltages and currents in the circuit of FIG. 1 when the pow line conditioner is operating.
Figure 4:
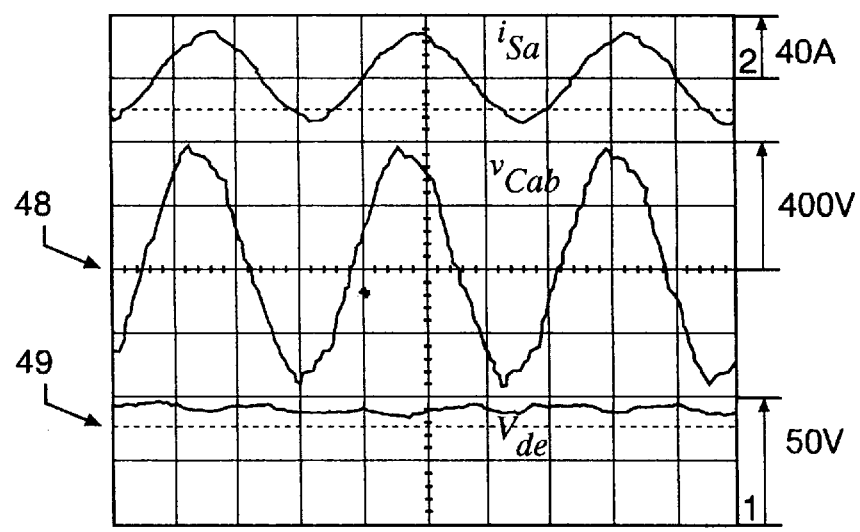
FIG. 4 illustrates the output voltage produced by the power line conditioner when operating as shown in FIG. 3 and the corresponding line current and direct-current voltage for the power sources of the power line conditioner.

FIGS. 2–4 illustrate voltage and current waveforms actually created by an experimental system constructed to illustrate the operation of the present invention. The experimental power line conditioner is a prototype system constructed to demonstrate the operation of higher voltage embodiments suitable for connection to typical distribution feeders or other electric power lines. The experimental power line conditioner includes an 11-level wye-connected 3-phase cascade inverter connected in a parallel, as shown in FIG. 1. This 11-level wye connection produces 21 levels line-to-line at the power line conditioner output terminals. The line voltage (Vta) is 240V, and the power line conditioner 10 has a power rating of 10 kVA. For this experimental system, the load 8 is a diode rectifier.

FIG. 2 illustrates the condition of the power flowing in the electric power line 4 when serving the highly non-linear load 8 with the power line conditioner 10 turned off. The waveform 40 illustrates the line voltage (Vta), which is highly distorted due to high source impedance and the non-linear nature of the load 8. The waveform 42 illustrates the line current ($I_s$a), which is also highly distorted due to the non-linear nature of the load 8. The waveform 44 illustrates the current flowing into the power line conditioner (Ica), which is zero because the device is turned off. The waveform 46 illustrates the load current (Ila), which is nearly the same as the line current ($I_s$a). Those skilled in the art will appreciate that the line current ($I_s$a) lags the line voltage (Vta) by about 25 degrees, and that both waveforms are distorted with high levels of the 5th harmonic.

FIG. 3 illustrates these same parameters after the power line conditioner 10 is turned on. The waveform 40' illustrates the line voltage (Vta), which is a clean sine wave due to the operation of the power line conditioner 10. The waveform 42' illustrates the line current ($I_s$a), which much closer to a clean but still exhibits some background distortion. The waveform 44' illustrates the compensator current (Ica) flowing into the power line conditioner 10, which includes the 5th harmonic and the reactive component of the load current. The waveform 46' illustrates the load current (Ila), which is the same as before the power line conditioner 10 was turned on. A comparison of FIGS. 2 and 3 reveals that the power line conditioner 10 corrects the line voltage (Vta) by making the current (Ica) flowing into the power line conditioner 10 equal to the harmonic and reactive disturbance 12 in the loal current (Ila). Note that the line voltage (Vta) and the line current (I$_s$a) are now in phase.

FIG. 4 illustrates the line-to-line (i.e., 21 level) output voltage produced by the power line conditioner 10 when operating as shown in FIG. 3. Specifically, waveform 48 illustrates this output voltage (V$_c$ab). Those skilled in the art will appreciate the presence of the harmonics in this voltage waveform, which is applied to the filter 20 to extract the current (Ica) from the line current (I$_s$a). Waveform 49 illustrates the voltage of the monitored capacitor of the multi-level cascade inverter 22, which remains stable and continually charged to the desired fully-charged level during operation of the power conditioner 10.

Figure 5:
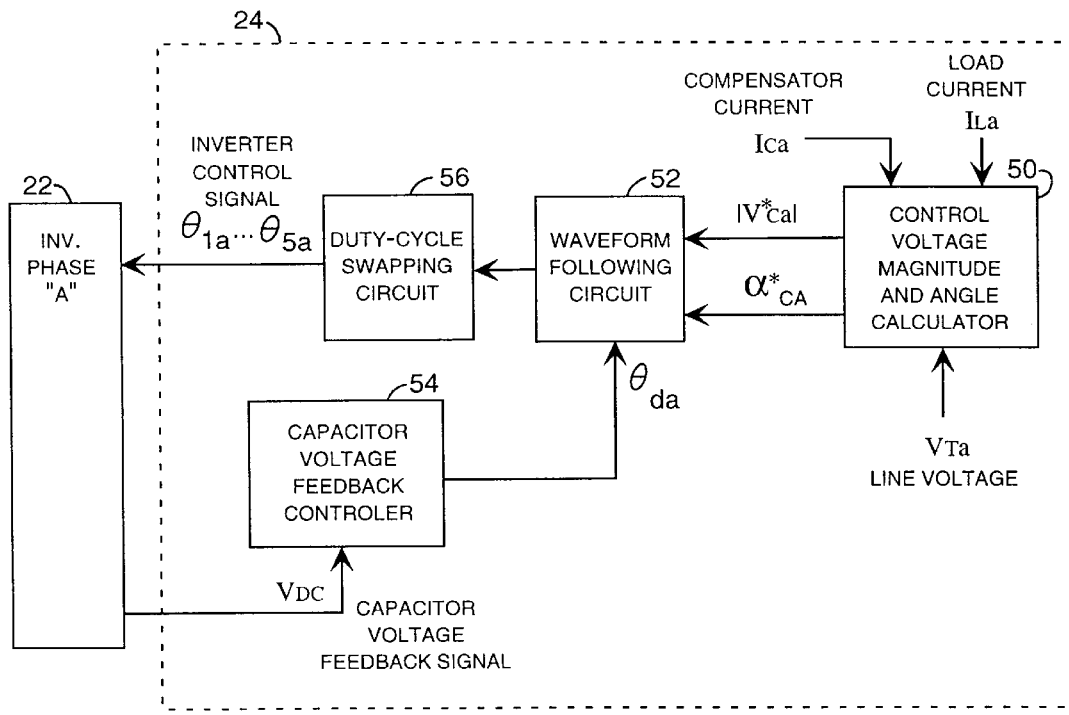
FIG. 5 is a block diagram of a control system for a power line conditioner.

FIG. 5 is a block diagram of a first type of control system 24 for the power line conditioner 10. The control system 24 includes a control voltage magnitude and angle calculator 50 that receives a control signal representing the load current (Ila) and feedback control signals representing the compensator current (Ica) and the line voltage (Vta). The control voltage magnitude and angle calculator 50 then extracts the harmonic component from the load current (Ila) by filtering out the fundamental frequency. The control voltage magnitude and angle calculator 50 also extracts the reactive component from the load current (Ila) by computing the phase angle between the line voltage (Vta) and the load current (Ila).

The control voltage magnitude and angle calculator 50 uses these control signals to compute the control voltage magnitude and angle. The circuit for computing the control voltage magnitude and angle is described in greater detail with reference to FIG. 9. The control voltage magnitude and angle is passed to a waveform following circuit 52, which computes the triggering angels for the multi-level cascade inverter 22 to follow the control voltage waveform in real-time. The waveform following circuit 52 also adjusts the phase angle of the control voltage in response to a DC offset angle received from a capacitor voltage feedback controller 54. This is a conventional proportional-integral feedback controller that is well known in the art for offsetting losses incurred in the power line conditioner 10. In sum, the capacitor voltage feedback controller 54 determines the DC offset angle required to continually obtain the desired fully-charged voltage level in the capacitors of the cascade multi-level inverter 22.

Once the waveform following circuit 52 has computed the triggering phase angles for generating an output voltage that approximately follows the control voltage waveform while continually obtaining the desired fully-charged voltage level in the capacitors of the cascade multi-level inverter 22, these triggering phase angles are passed to a duty-cycle swapping circuit 56, which rotates the duty cycles among the levels of the inverter to maintain a voltage balance among the various capacitors. This aspect of control operation is shown best in FIG. 13. The triggering phase angles determined by the duty-cycle swapping circuit 56 are then used to drive the cascade multi-level inverter 22, as shown best in FIG. 11.

Figure 6:
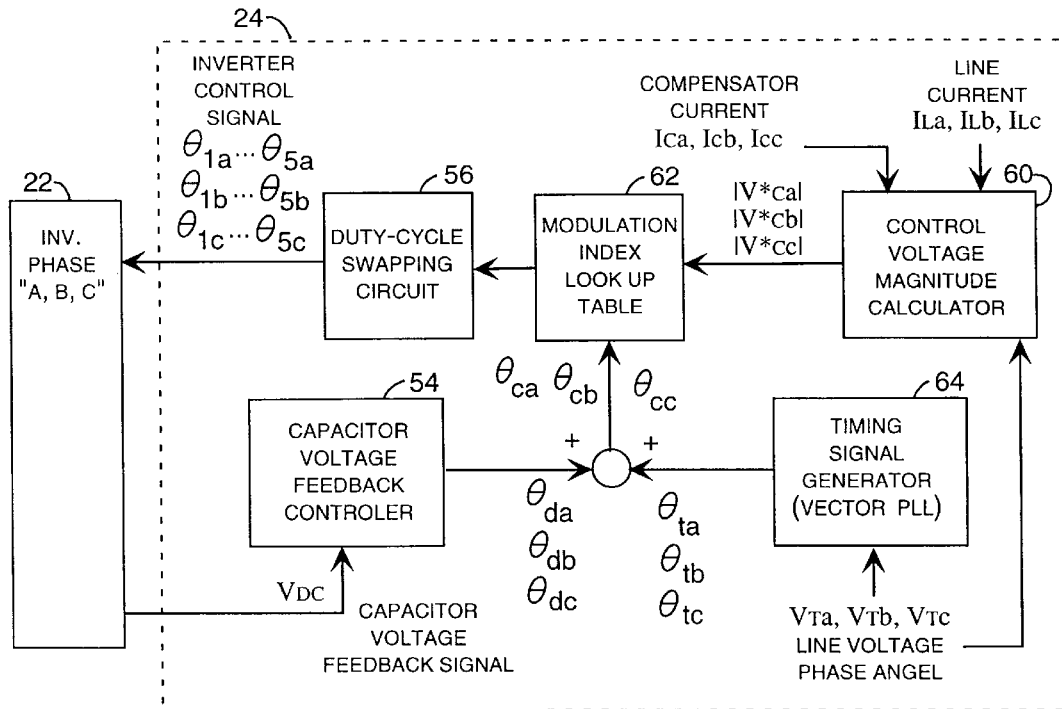
FIG. 6 is a block diagram of an alternative control system for a power line conditioner.

FIG. 6 is a block diagram of an alternative control system 24' for the power line conditioner 10. This control system avoids implementation difficulties that arise in construction the waveform following circuit 52 by replacing the real-time waveform following function with a look-up function based on a modulation index. Advantageously, the modulation index can be computed from the magnitudes of the three line phase voltages, without the need to track the voltage angles in real time.

In the control system 24', the duty-cycle swapping circuit 56 and the capacitor voltage feedback controller 54 are the same as in the control system 24 described above. The control voltage magnitude and angle calculator 50 is replaced by a control voltage magnitude calculator 60, which calculates the multi-phase control voltage magnitude (Vc*) as the square root of the sum of the squares the instantaneous phase voltage magnitudes.

The control voltage magnitude is used to compute a modulation index that is used to look up the triggering phase angles in a modulation index look-up table 62. The phase angle information for the control voltage is provided by a timing signal generator vector phase-locked loop (PLL) 64, which extracts the phase angle information from the phase voltages. The control voltage phase angles from the timing signal generator 64 is then added to the phase angle offset from the capacitor voltage feedback controller 54 to compute the starting point for applying the triggering phase angles in the modulation index look-up table 62. This creates a complete control voltage waveform for each phase, which is passed to the duty-cycle swapping circuit 56, which in turn drives the multi-level cascade inverter 22.

Figure 7:
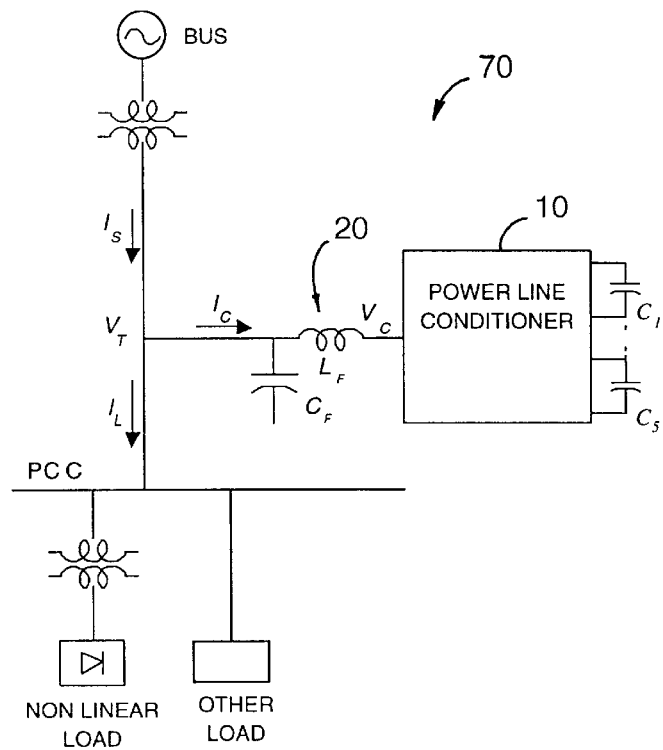
FIG. 7 is a one line diagram of parallel-connected power line conditioner for a distribution system.
Figure 8:
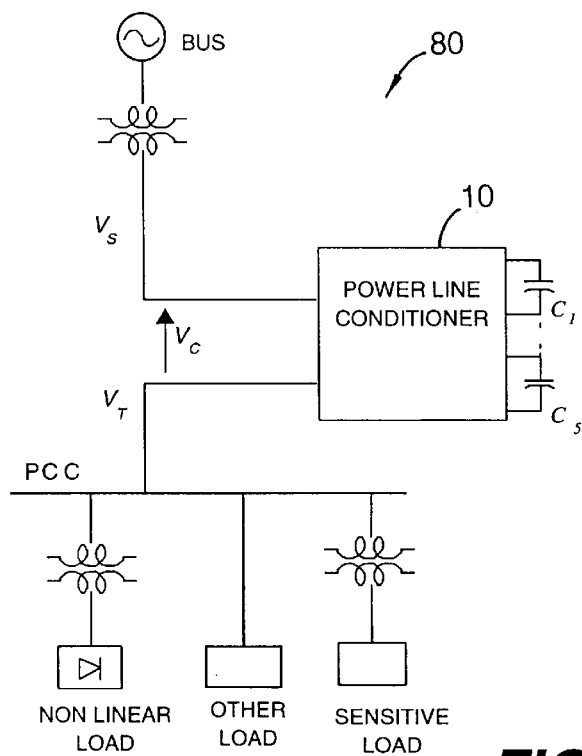
FIG. 8 is a one line diagram of series-connected power line conditioner for a distribution system.

FIG. 7 is a one line diagram 70 for a parallel-connected power line conditioner 10 for a distribution system. In this figure, the filter 20 is shown outside the power line conditioner 10 but should still be considered part of the power line conditioner, as shown in FIG. 1. FIG. 8 is a one line diagram 80 for a series-connected power line conditioner 10 for a distribution system.

Figure 9:
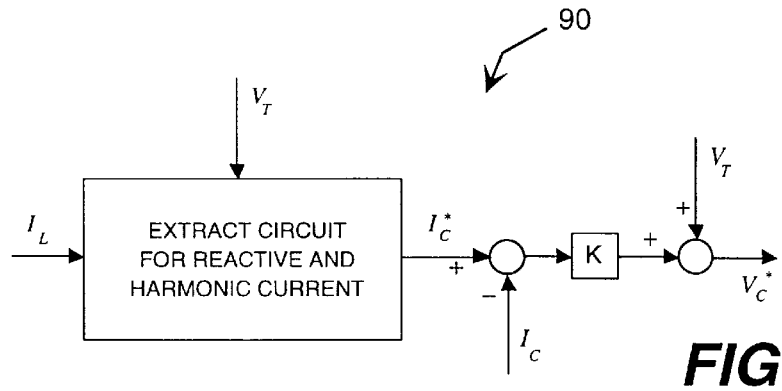
FIG. 9 is a block diagram illustrating a circuit for producing a control voltage for a power line conditioner.

FIG. 9 is a block diagram illustrating a control circuit 90 for producing a control voltage for the power line conditioner 10. For each phase, the control circuit 90 includes an extract circuit 92 that receives control signals representing the line voltage (Vt) and the load current (Il). The control voltage magnitude and angle calculator 50 then extracts the harmonic component from the load current by filtering out the fundamental frequency. The control voltage magnitude and angle calculator 50 also extracts the reactive component from the load current by computing the phase angle between the line voltage (Vt) and the load current (Il). The reactive and harmonic components are then combined into a control current (Ic*) that includes the reactive and harmonic components of the load current. This is the compensator current (Ic) desired to extract the harmonic and reactive disturbance from the load current.

The control circuit 90 then compares the control current (Ic*) the actual compensator current (Ic) received in a feedback control signal to compute an error signal. This error signal is them multiplied by a gain "K" and added the line voltage (Vt) to obtain the desired control voltage (Vc*). This is the desired output voltage for the multi-level cascade inverter 22 (i.e., the phase voltage associated with the waveform 48 shown in FIG. 4) which results in a clean sine wave for the line voltage (Vt). As described with reference to FIGS. 5 and 6, the control system 24 uses the control voltage to drive the multi-level cascade inverter 22. The gain is then adjusted to minimize the error. Those skilled in the art will appreciate that as the error approaches zero, the compensator current (Ic) approaches the control current (Ic*) and the line voltage (Vt) approaches a clean sine wave.

Figure 10:
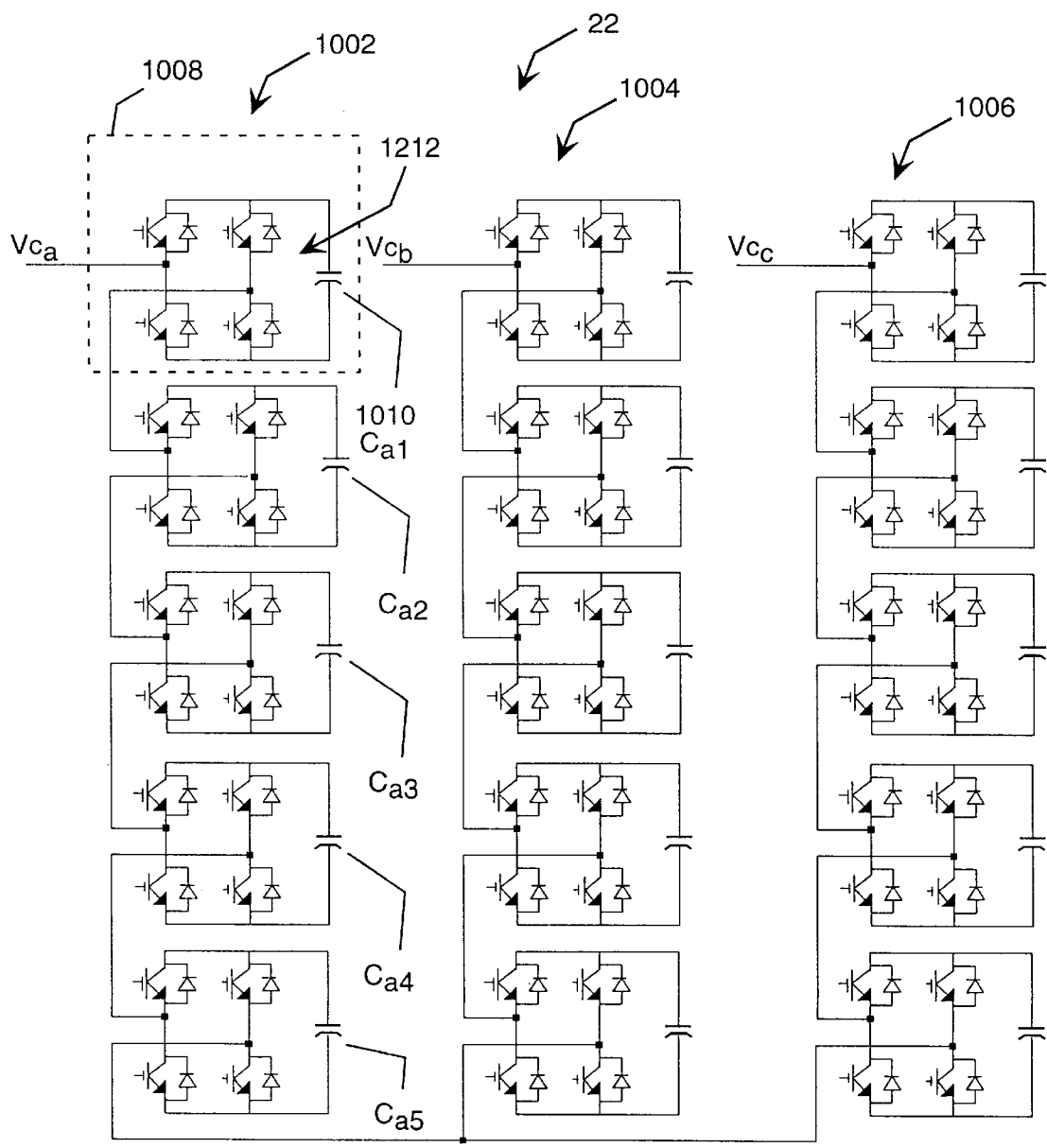
FIG. 10 is a schematic diagram illustrating a 3-phase 11-level cascade inverter for the power line conditioner.

FIG. 10 is a schematic diagram illustrating a 3-phase 11-level cascade inverter 22 for the power line conditioner 10. The inverter 22 includes three phase legs 1002, 1004, and 1006 connected in a wye configuration. Each leg includes five identical full-bridge inverters, represented by the full-bridge inverter 1008, connected in series. Each full-bridge inverter includes an independent DC power source 1010, typically a capacitor, and a full-bridge switching circuit 1212. Each leg of the full-bridge switching circuit 1212 includes an IGBT switch with an anti-parallel clamping diode. The multi-level cascade inverter 22 is described in detail in commonly-owned U.S. Pat. No. 5,642,275, which is incorporated into this specification by reference.

Figures 11, 12:
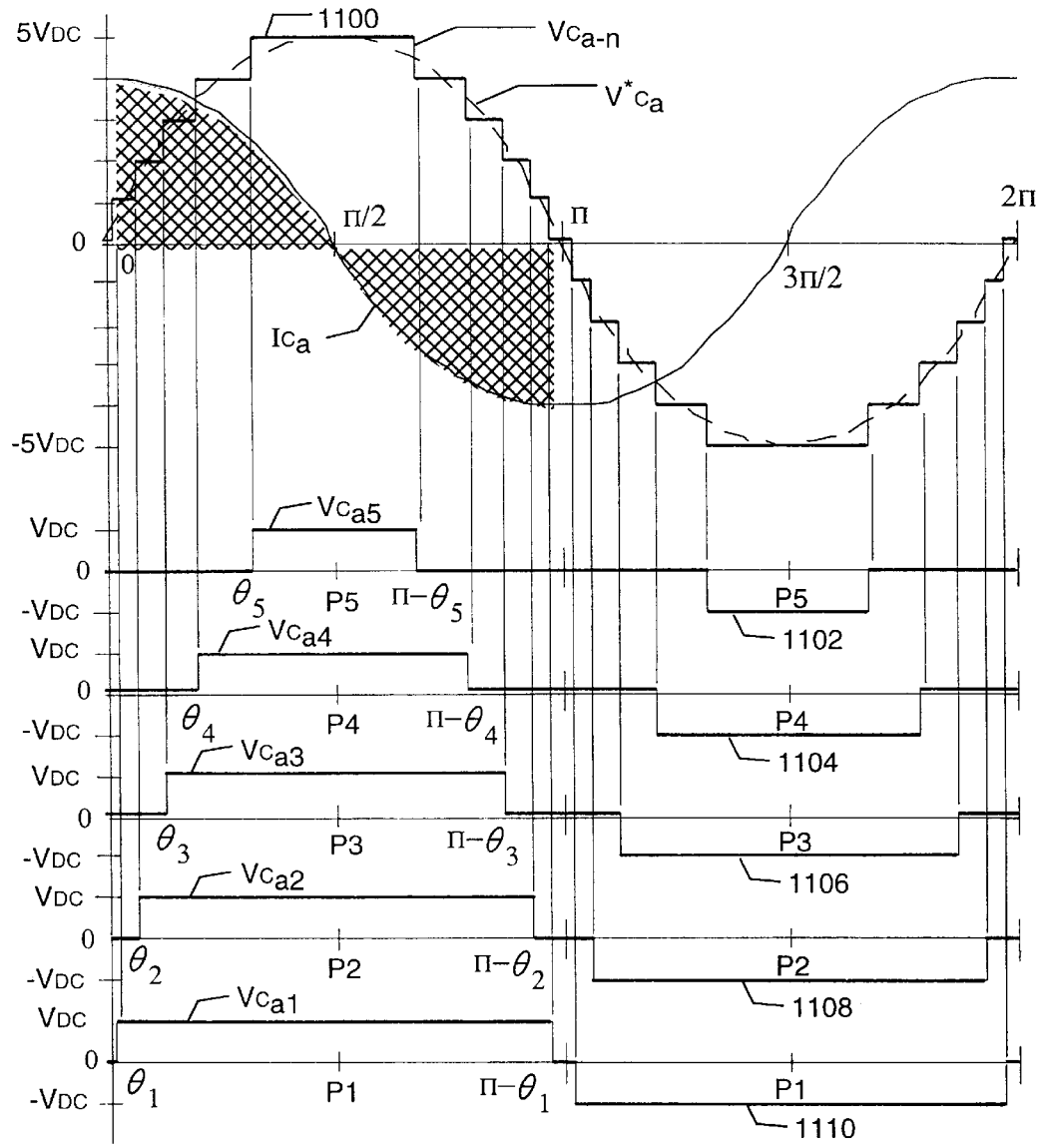
FIG. 11 illustrates waveforms of the 11-level cascade inverter.
FIG. 12 is a table illustrating the duty-cycle phase angles of 11-level cascade inverter.

FIG. 11 illustrates the quasi-square or stair-step waveform 1100 generated by one phase leg of the 11-level cascade inverter shown FIG. 10. The full-bridge switching circuit 1212 allows each DC power source 1010 to be connected in the positive and the negative portions of the control voltage waveform. The quasi-square waveforms 1102–1110 show the output voltage for the various full-bridge inverter levels 1008 of the inverter 22.

FIG. 12 is a look-up table 1200 illustrating the duty-cycle phase angles of 11-level cascade inverter. The table 1200 can be used to look up a stored set of triggering phase angles 1202 using a modulation index 1204. The look up table 1200 is easier to implement than a waveform following circuit and produces substantially the same result, which is a set of phase control voltages for driving the multi-level cascade inverter 22. The look-up table 1200 is referenced at the ~61 kHz sampling rate of the control system 24, which allows the modulation index to change 1024 times for each 60 Hz cycle of the control voltage. This allows the power line conditioner 10 to create the harmonic constituents of the control voltage needed to extract the harmonic and/or reactive disturbance caused by the load current.

Figure 13:
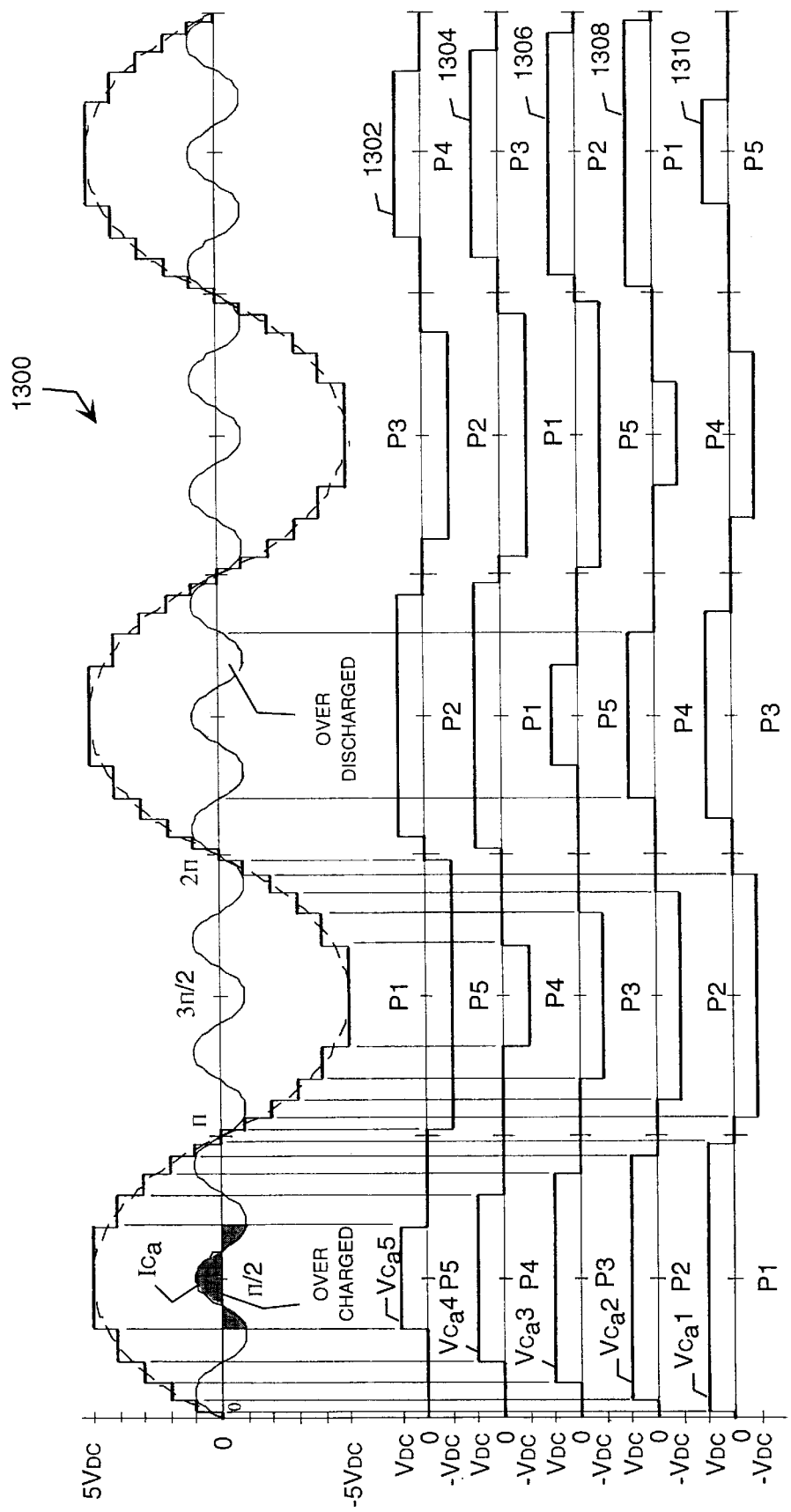
FIG. 13 illustrates waveforms for rotating duty cycles of the 11-level cascade inverter.

FIG. 13 illustrates waveforms 1300 for rotating duty cycles of the 11-level cascade inverter. The waveforms 1302–1310 show the output voltage for the various full-bridge inverter levels 1008 of the inverter 22. The duty cycles for the each level of the control voltage waveform rotates among the full-bridge inverter levels 1008, which balances the voltage in the capacitors 1010 of the various full-bridge inverter levels and, thus, allows the voltage of one of the capacitors to be used as the DC voltage feedback signal (Vdc).

System Configuration of the Experimental Power Line Conditioner

The new power line conditioner 10 using the cascade multilevel inverter 22 may be used for voltage regulation, reactive power (var) compensation and harmonic filtering of a power distribution system. This power line conditioner can be connected in parallel with the system at PCC, as shown in FIG. 7, or connected in series with the source before PCC as shown in FIG. 8. The series power line conditioner can be controlled to provide pure, constant sine-wave voltage to the loads that are sensitive to voltage fluctuation, sags, swings, and harmonics. Or it can be controlled to block harmonic current flow from the nonlinear loads that are the voltage-source type of harmonic sources. The parallel power line conditioner of FIG. 7 (also shown in greater detail in FIG. 1) is typically used to simultaneously compensate for reactive power and harmonics. This power line conditioner also implements a control method for balancing the voltages of the DC power sources of the cascade inverters.

Power Line Conditioner System and Control

FIG. 7 shows the configuration of an experimental power line conditioner including an 11-level cascade inverter, which will be described in detail to illustrate the design and operation of the invention. The cascade inverter is connected to the power system through a small filter, LF and CF suffix F. FIG. 9 shows the control block diagram for the power line conditioner. To compensate for reactive and harmonic current, the load current $I_L$ is sensed, and its reactive and harmonic components are extracted. The current reference, $I_C^*$, of the power line conditioner can be the load reactive current component, harmonic component, or both depending upon the compensation objectives. The cascade inverter has to provide a voltage $V_C^*$ so that the power line conditioner current $I_C$ tracks the current reference $I_C^*$. $V_T$ is the line terminal voltage, and K is a gain. In a distribution system, the purpose of a power line conditioner is to provide a constant and stable terminal voltage to loads. In this case, a constant sine wave is assigned to the voltage reference $V_C^*$.

Cascade Multilevel Inverter

A cascade M-level inverter consists of (M-1)/2 H-bridges in which each bridge has its own separate DC source. This inverter (1) can generate almost sinusoidal waveform voltage with only one time switching per cycle, (2) can eliminate transformers of multipulse inverters used in the conventional static VAR compensators, and (3) makes possible direct connection to the 13.8 kV distribution system in parallel and series without any additional transformer by using the experimental 11-level inverter with 3.3 kV IGBTs. A series reactance provided by the filter inductor $L_f$ is required for coupling to the AC system. Alternatively, this required reactance can be naturally provided by leakage inductance of the service transformer that already exists in the power system. In summary, the power line conditioner is much more efficient and suitable for VAR compensation and harmonic filtering of distribution systems than traditional multipulse and PWM inverters.

FIG. 10 shows the structure of the 11-level cascade inverter used in the experimental power line conditioner system of FIG. 1. As shown in FIG. 10, each phase of the cascade inverter consists of five H-bridge inverter units in series. With this structure, any voltage level is easy to obtain by increasing the number of inverter units.

FIG. 11 shows waveforms of the 11-level cascade inverter for VAR compensation. The output phase voltage $v_{Ca-n}$ is the sum of five H-bridge inverter units' outputs. The phase voltage magnitude is controlled by each inverter's duty cycle. For VAR compensation, the phase current, $i_{Ca}$, is always leading or lagging the phase voltage $v_{Ca-n}$ by 90°. The average charge to each DC capacitor is equal to zero over every half-line cycle for all pulses P1 to P5. In other words, the voltage of each DC capacitor is always balanced. However, this is not true when the cascade inverter is applied to harmonic filtering. FIG. 13 shows the waveforms, where, for instance, a $5^{th}$-harmonic current needs to be absorbed by the inverter. In this case, as shown in the figure, an H-bridge inverter unit will be overcharged if it repeats pulse P5 and over-discharged if it repeats pulse P4. In order to overcome this problem, swapping pulses every half cycle as shown in FIG. 13 is implemented. As a result, all DC capacitors will be equally charged and balanced.

As shown in FIG. 11, rotating pulses P1 through P5 every half cycle among the five inverter units makes all DC capacitors equally charged and balanced over five half cycles. Therefore, in order to regulate all DC capacitors' average voltages only one DC capacitor's voltage needs to be monitored and fed back. This feature makes control very simple and reliable. FIG. 6 shows the control block diagram of the power line conditioner system. To control all DC capacitors' voltages, a feedback loop is used. Note that only one DC capacitor's voltage is detected.

In FIG. 6, a vector phase-locked loop (PLL) is used to get the phase angle of the line terminal voltage. A proportional and integral (PI) controller is employed to regulate the DC capacitors' voltage. In the Duty-Cycle Look-Up Table, the duty cycle data, $\theta_1$ through $\theta_5$, is stored over one fundamental cycle. Table I shows the phase angles calculated off-line to minimize harmonics for each modulation index (MI), which is defined as in equation (1). A Duty-Cycle Swapping Circuit rotates pulses every half cycle, as shown in FIG. 13.

$$MI = V_C^* \Big/ \left( \sqrt{\frac{3}{2}} \frac{4}{\pi} \cdot 5 V_{dc} \right) \tag{1}$$

From the cascade inverter structure, it is obvious that more capacitance is needed compared with a traditional 2-level inverter. For the 11-level cascade inverter to compensate reactive power only, it has been shown that 1.36 times of conventional VAR compensator's capacitance is required. For VAR and harmonic compensation, all DC capacitors should have an equal capacitance because of pulse rotation among the H-bridge units instead of fixed pulse patterns. In addition, the required capacitance should be determined in the worst case. From FIGS. 11 and 13, one can see that harmonics have little contribution to the capacitors' charge because of their higher frequency but the reactive current may dominate voltage ripples of the DC capacitors at the fundamental frequency. Therefore, the required DC capacitance of each capacitor can be expressed as $$C_{dc} = \frac{\Delta Q}{\Delta V_{dc}} = \frac{\int_{\theta_1}^{T/4} \sqrt{2} I_{Cq} \cos \omega t \, dt}{\Delta V_{dc}} \quad (2)$$

For the experimental system rating 10 kVA at 240V ac line voltage; $V_{dc}$=45V (the equivalent 2-level DC link voltage= $\sqrt{3} \cdot 5 \cdot V_{dc}$=390V); the reactive component of compensator current, $I_{Cq}$=11.3 A[rms]; and a 4,700 μF capacitor is used for each H-bridge unit, which results in 9V of DC voltage peak-to-peak ripple, i.e., ±5%. The total required energy storage capacity is 15·½$C_{dc}V_{dc}^2$=71 Joules for 15 DC capacitors of the three-phase cascade inverter. The equivalent capacitance is 939 μF at 390V of DC voltage.

To give a physical feeling about how high the required capacitance is, let us compare it with the traditional 3-phase ac adjustable speed drive's (ASD's) DC link capacitance. For the traditional diode rectifier with smoothing capacitor feeding an inverter, the empirical value of discharging time is 15~30 ms in order to get ±5~10% of voltage ripple and to obtain enough ride-through capability. The DC capacitance, $C_{dc}$, is typically designed from the following formula:

$$\frac{\frac{1}{2}C_{dc}V_{link}^2}{P} = 15 \sim 30 \, \text{ms}, \quad (3)$$

where $V_{link}$ is the DC link voltage and P is the power rating. Therefore, for P=10 kW and 240V ac line voltage, the energy storage capacity is ½$C_{dc}V_{link}^2$=150~300 Joules and DC capacitance is $C_{dc}$=3,100~6,200 μF. For 13.8 kV distribution systems, power ratings are in MVA range at which many DC capacitors need to be paralleled in conventional inverters. For the cascade inverter, DC capacitors are separately disposed to each H-bridge unit.

From the above description, one can see that the required DC capacitance of the cascade inverter is very practical, and the required energy storage capacity is actually smaller than that of the traditional ASD DC link capacitance. An additional feature about the cascade inverter is that it boosts voltage, i.e., each DC capacitor's voltage is very low (45V) whereas the ac output voltage is 240V. This low-voltage/high-capacitance requirement makes multilevel inverters advantageous for Ultra Capacitor (UC) applications. With UC's high-energy and high-power density, the cascade inverter can level power flow and support voltage during brownout and voltage sag, etc.

Experimental System and Results

The experimental power line conditioner system uses an 11-level (21 line-to-line level) 3-phase cascade inverter. The line voltage is 240V, power line conditioner rating 10 kVA. The power line conditioner adopts the conventional current injection method as used in active power filters to compensate load harmonics and reactive power. Each DC capacitor rates 4,700 μF and 63V, which is slightly bigger in size than the H-bridge unit.

FIGS. 2 and 3 show experimental waveforms of phase 'a' of the power line conditioner system. Before the power line conditioner was started, both the terminal voltage, $v_{Ta}$, at the PCC and the source current, $i_{Sa}$, were distorted and lagging from the terminal voltage due to the nonlinear and reactive loads. Here, the load is a diode rectifier. Since the high line impedance is about 20% and high background distortion is about 5%, severe voltage distortion is observed at the PCC. Also, the load current, $i_{La}$, lags the terminal voltage by about 25 degrees. After the power line conditioner was started, however, both the terminal voltage and source current became sinusoidal. In addition, the source current became in phase with the terminal voltage. The power line conditioner injected a compensation current, $i_{Ca}$ containing both harmonic and reactive current. Note that the terminal voltage is a pure sine wave, whereas the source current is still slightly distorted. This is because the source current has to include some harmonics to cancel the source voltage background distortion. The effectiveness and validity of the power line conditioner is clearly demonstrated.

FIG. 4 shows experimental waveforms, where $v_{Cab}$ is the 'ab' line-to-line voltage of the inverter and $V_{dc}$ is the DC voltage across $C_{a1}$ of FIG. 11. Note that, although the terminal voltage, $v_{Ta}$, becomes sinusoidal after compensation, the inverter output voltage $v_{Cab}$ is not sinusoidal because it has to generate harmonics in order for the inverter to inject the required compensation current $i_{Ca}$. To generate a desired harmonic voltage, the number of the cascade inverter levels should be high enough. The higher the number of levels is, the better performance the inverter can provide. It is obvious from the results that the 11-level cascade inverter is high enough to compensate load harmonics. It should be mentioned here that although the DC voltage control loop only detects the voltage across the capacitor, $C_{a5}$, of FIG. 7, all other DC voltages are also balanced. To demonstrate this, FIG. 4 shows that the DC voltage across $C_{a1}$ is stable and balanced.

The present invention thus provides a cascade inverter that is suitable for universal power conditioning of power systems, especially for medium voltage systems. The inverter provides lower costs, higher performance, less EMI, and higher efficiency than the traditional PWM inverter for power line conditioning applications. Because the switching frequency is the line frequency, switching losses and related EMI are negligible. A control scheme has been presented for reactive and harmonic compensation, which ensures DC voltage balance. Future use of Ultra Capacitors makes the cascade inverter more attractive for wider utility applications.

It should be understood that the foregoing pertains only to the preferred embodiments of the present invention, and that numerous changes may be made to the embodiments described herein without departing from the spirit and scope of the invention.

What is claimed is:

1. A power line conditioner operative for:
   detecting a harmonic component in current flowing in an electric power line;
   computing a control voltage for extracting the harmonic component from the current flowing in the electric power line;
   computing a set of triggering phase angles for producing a quasi-square wave approximation of the control voltage;
   receiving a direct-current power source feedback signal representative of a continually obtained fully-charged voltage level in a plurality of direct-current power sources of a cascade multi-level inverter;

based on the direct-current power source feedback signal, computing a direct-current phase angle offset for continually obtaining a desired fully-charged voltage level in the direct-current power sources;

driving the cascade multi-level inverter to produce an output voltage corresponding to the quasi-square wave approximation of the control voltage adjusted by the direct-current phase angle offset; and supplying the output voltage to the electric power line to substantially extract the harmonic component from the current flowing in the electric power line.

2. The power line conditioner of claim 1, wherein the cascade multi-level inverter comprises a separate direct-current power source for each of a plurality of cascade levels.

3. The power line conditioner of claim 2, wherein the cascade multi-level inverter comprises a separate cascade leg of series-connected full-bridge inverters for each of a plurality of phases of the electric power line.

4. The power line conditioner of claim 3, wherein each leg of the cascade multi-level inverter is connected in parallel with a corresponding phase of the electric power line.

5. The power line conditioner of claim 3, wherein each leg of the cascade multi-level inverter is connected in series with a corresponding phase of the electric power line.

6. The power line conditioner of claim 1, further operative for filtering the output voltage before supplying the output voltage to the electric power line.

7. The power line conditioner of claim 1, further operative for detecting the harmonic component in the current flowing in the electric power line by:

obtaining a load current signal for the electric power line; and filtering the load current signal to remove a fundamental frequency.

8. The power line conditioner of claim 1, wherein:

the quasi-square wave approximation of the control voltage comprises a plurality of quasi-square component waves;

each quasi-square component wave defines a duty cycle for a level of the quasi-square wave approximation of the control voltage; and the power line conditioner is further operative for rotating the duty cycles among the cascade levels of the cascade multi-level inverter.

9. The power line conditioner of claim 1, wherein the current flowing the electric power line comprises a plurality of phase currents, further operable for:

computing a phase control voltage magnitude and angle for each phase;

computing a phase control voltage waveform corresponding to the phase control voltage magnitude and angle for each phase; and driving the cascade multi-level inverter to produce a phase output voltage that approximately follows the phase control voltage magnitude and angle for each phase while continually obtaining the desired fully-charged voltage level in the direct-current power sources of the cascade multi-level inverter.

10. The power line conditioner of claim 1, wherein the current flowing the electric power line comprises a plurality of phase currents, further operable for:

computing a multi-phase control voltage magnitude representative of an instantaneous combination of a phase voltage and angle for each phase;

determining a modulation index corresponding to the multi-phase control voltage magnitude;

looking up a predefined set of triggering phase angles for each phase corresponding to the modulation index; and driving the cascade multi-level inverter to produce a phase output voltage corresponding to the triggering phase angles for each phase while continually obtaining the desired fully-charged voltage level in the direct-current power sources of the cascade multi-level inverter.

11. The power line conditioner of claim 1, further operable for computing the control voltage by:

receiving a current feedback signal representative of a current flowing into the power line conditioner;

receiving a voltage feedback signal representative of a terminal voltage at the point where the power line conditioner supplies the output voltage to the electric power line;

computing an error signal by comparing the current feedback signal to the harmonic component of the current flowing in the electric power line;

computing the control voltage by combining the voltage feedback signal with the error signal adjusted by a gain; and controlling the gain to minimize the error signal.

12. The power line conditioner of claim 1 further operative for:

detecting a reactive component in the current flowing in an electric power line;

computing a dual-purpose control voltage for simultaneously extracting the harmonic component and the reactive component from the current flowing in the electric power line;

computing a set of triggering phase angles for producing a quasi-square wave approximation of the dual-purpose control voltage;

driving the cascade multi-level inverter to produce a dual-purpose output voltage corresponding to the quasi-square wave approximation of the dual-purpose control voltage adjusted by the direct-current phase angle offset; and supplying the dual-purpose output voltage to the electric power line to substantially extract the harmonic component and the reactive component from the current flowing in the electric power line.

13. The power line conditioner of claim 12, further operative for detecting the reactive component in the current flowing in the electric power line by:

obtaining a line voltage signal for the electric power line; and computing a phase angle between the line voltage and load current signals.

14. A power line conditioner comprising:

a terminal for connecting the power line conditioner to the electric power line;

a current sensor for producing a load current signal representative of the current flowing in the electric power line;

a current feedback signal for representing the current flowing into the power line conditioner;

a voltage feedback signal for representing the voltage at the terminal;

a multi-level cascade inverter having a series-connected full-bridge inverter including a separate direct-current power source for each cascade level;

a direct-current feedback signal for representing a continually obtained fully-charged voltage level in the direct-current power sources of the multi-level cascade inverter; and a control system for:
receiving the load current signal, the direct-current feedback signal, the current feedback signal, and the voltage feedback signal,
detecting a harmonic component in the current flowing in the electric power line,
computing an error signal by comparing the current feedback signal to the harmonic component of the current flowing in the electric power line,
computing a control voltage by combining the voltage feedback signal with the error signal adjusted by a gain,
based on the direct-current power source feedback signal, computing a direct-current phase angle offset for continually obtaining a desired fully-charged voltage level in the direct-current power sources, and
driving the multi-level cascade inverter to produce an output voltage at the terminal that approximates the control voltage adjusted by the direct-current phase angle offset to substantially extract the harmonic component from the current flowing in the electric power line while continually obtaining the desired fully-charged voltage level in the direct-current power sources.

15. The power line conditioner of claim 14, further comprising a filter for smoothing the output voltage connected between the multi-level cascade inverter and the terminal.

16. The power line conditioner of claim 14, wherein the cascade multi-level inverter comprises a separate cascade leg of series-connected full-bridge inverters for each of a plurality of phases of the electric power line.

17. The power line conditioner of claim 16, wherein each leg of the cascade multi-level inverter is connected in parallel with a corresponding phase of the electric power line.

18. The power line conditioner of claim 16, wherein each leg of the cascade multi-level inverter is connected in series with a corresponding phase of the electric power line.

19. The power line conditioner of claim 14, wherein the control system detects the harmonic component in the current flowing in the electric power line by filtering the load current signal to remove a fundamental frequency.

20. The power line conditioner of claim 14, wherein:
the output voltage comprises a quasi-square wave approximation of the control voltage defined by a plurality of quasi-square component waves;
each quasi-square component wave defines a duty cycle for a level of the quasi-square wave approximation of the control voltage; and
the power line conditioner is further operative for rotating the duty cycles among the cascade levels of the cascade multi-level inverter.

21. The power line conditioner of claim 14, wherein the current flowing in the electric power line comprises a plurality of phase currents, and the control system is further operable for:
computing a phase control voltage magnitude and angle for each phase;
computing a phase control voltage waveform corresponding to the phase control voltage magnitude and angle for each phase; and
driving the cascade multi-level inverter to produce a phase output voltage that approximately follows the phase control voltage magnitude and angle for each phase while continually obtaining the desired fully-charged voltage level in the direct-current power sources of the cascade multi-level inverter.

22. The power line conditioner of claim 14, wherein the current flowing the electric power line comprises a plurality of phase currents, and the control system is further operable for:
computing a multi-phase control voltage magnitude representative of an instantaneous combination of a phase voltage and angle for each phase;
determining a modulation index corresponding to the multi-phase control voltage magnitude;
looking up a predefined set of triggering phase angles for each phase corresponding to the modulation index; and
driving the cascade multi-level inverter to produce a phase output voltage corresponding to the triggering phase angles for each phase while continually obtaining the desired fully-charged voltage level in the direct-current power sources of the cascade multi-level inverter.

23. The power line conditioner of claim 14, wherein the control system is further operative for:
detecting a reactive component in the current flowing in an electric power line;
computing a dual-purpose control voltage for simultaneously extracting the harmonic component and the reactive component from the current flowing in the electric power line;
computing a set of triggering phase angles for producing a quasi-square wave approximation of the dual-purpose control voltage;
driving the cascade multi-level inverter to produce a dual-purpose output voltage corresponding to the quasi-square wave approximation of the dual-purpose control voltage adjusted by the direct-current phase angle offset; and
supplying the dual-purpose output voltage to the electric power line to substantially extract the harmonic component and the reactive component from the current flowing in the electric power line.

24. The power line conditioner of claim 23, wherein the control system is further operative for detecting the reactive component in the current flowing in the electric power line by:
obtaining a line voltage signal for the electric power line; and
computing a phase angle between the line voltage and load current signals.

25. A method for conditioning electric power flowing in an electric power line, comprising the steps of:
receiving a load current signal representing the current flowing in the electric power line;
receiving a current feedback signal representing the current flowing into a power line conditioner connected to the electric power line at a terminal;
receiving a voltage feedback signal representing the voltage at the terminal;
receiving a direct-current feedback signal representing a continually obtained fully-charged voltage level in direct-current power sources of a multi-level cascade inverter within the power line conditioner;
detecting a harmonic component in the current flowing in the electric power line;
computing an error signal by comparing the current feedback signal to the harmonic component of the current flowing in the electric power line;

computing a control voltage by combining the voltage feedback signal with the error signal adjusted by a gain;

based on the direct-current power source feedback signal, computing a direct-current phase angle offset for continually obtaining a desired fully-charged voltage level in the direct-current power sources; and driving the multi-level cascade inverter to produce an output voltage at the terminal that approximates the control voltage adjusted by the direct-current phase angle offset to substantially extract the harmonic component from the current flowing in the electric power line while continually obtaining the desired fully-charged voltage level in the direct-current power sources.

26. The method of claim 25, further comprising the step of smoothing the output voltage.

27. The method of claim 25, further comprising the steps of:

producing a quasi-square wave approximation of the control voltage defined by a plurality of quasi-square component waves in which each quasi-square component wave defines a duty cycle for a level of the quasi-square wave approximation of the control voltage; and rotating the duty cycles among the cascade levels of the cascade multi-level inverter.

28. The method of claim 27, wherein the current flowing in the electric power line comprises a plurality of phase currents, further comprising the steps of:

computing a phase control voltage magnitude and angle for each phase;

computing a phase control voltage waveform corresponding to the phase control voltage magnitude and angle for each phase; and driving the cascade multi-level inverter to produce a phase output voltage that approximately follows the phase control voltage magnitude and angle for each phase while continually obtaining the desired fully-charged voltage level in the direct-current power sources of the cascade multi-level inverter.

29. The method of claim 27, wherein the current flowing in the power line comprises a plurality of phase currents, further comprising the steps of:

computing a multi-phase control voltage magnitude representative of an instantaneous combination of a phase voltage and angle for each phase;

determining a modulation index corresponding to the multi-phase control voltage magnitude;

looking up a predefined set of triggering phase angles for each phase corresponding to the modulation index; and driving the cascade multi-level inverter to produce a phase output voltage corresponding to the triggering phase angles for each phase while continually obtaining the desired fully-charged voltage level in the direct-current power sources of the cascade multi-level inverter.

30. The method of claim 29, further comprising the steps of:

detecting a reactive component in the current flowing in an electric power line;

computing a dual-purpose control voltage for simultaneously extracting the harmonic component and the reactive component from the current flowing in the electric power line;

computing a set of triggering phase angles for producing a quasi-square wave approximation of the dual-purpose control voltage;

driving the cascade multi-level inverter to produce a dual-purpose output voltage corresponding to the quasi-square wave approximation of the dual-purpose control voltage adjusted by the direct-current phase angle offset; and supplying the dual-purpose output voltage to the electric power line to substantially extract the harmonic component and the reactive component from the current flowing in the electric power line.

31. A computer readable medium storing computer-executable instructions for performing the method of claim 25.

32. A computer readable medium storing computer-executable instructions for performing the method of claim 30.

33. A device operable for performing the method of claim 25.

34. A device operable for performing the method of claim 30.

* * * * *